J. C. JENKINS.
SEED-PLANTER.

No. 173,473.

Patented Feb. 15, 1876.

Witnesses:
Jno. S. Slater
R. H. Whittlesey

Inventor:
Joseph C. Jenkins
by
Munn, Renwick & Lawrence

UNITED STATES PATENT OFFICE.

JOSEPH C. JENKINS, OF LEBANON, TENNESSEE, ASSIGNOR OF ONE-HALF HIS RIGHT TO WILLIAM H. BENNETT, OF SAME PLACE.

IMPROVEMENT IN SEED-PLANTERS.

Specification forming part of Letters Patent No. 173,473, dated February 15, 1876; application filed December 27, 1875.

*To all whom it may concern:*

Be it known that I, JOSEPH C. JENKINS, of Lebanon, in the county of Wilson and State of Tennessee, have invented a new and useful Improvement in Seed-Planters; and I do hereby declare the following to be a full, clear, and exact description of the same, reference being had to the accompanying drawings, in which—

Figure 1:
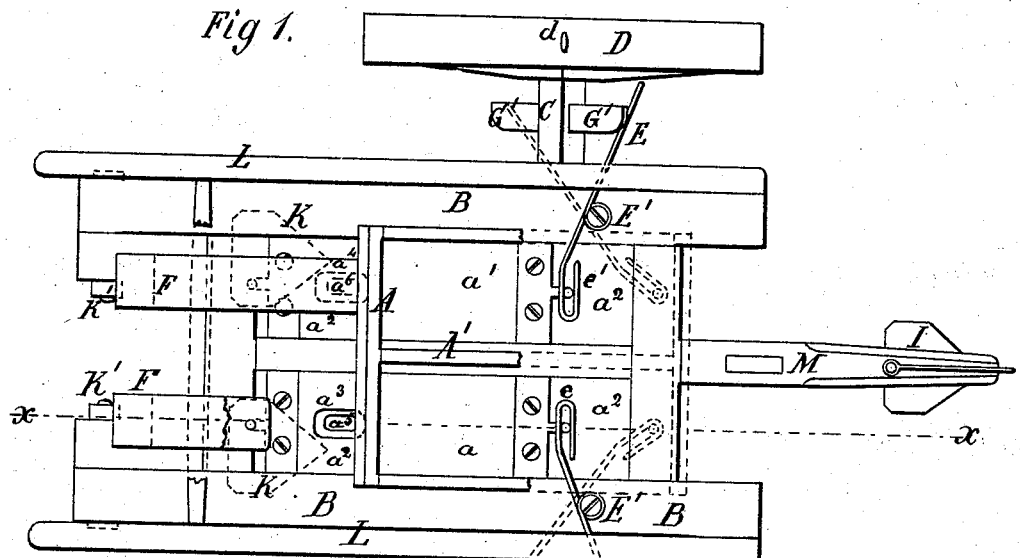
Figure 2:
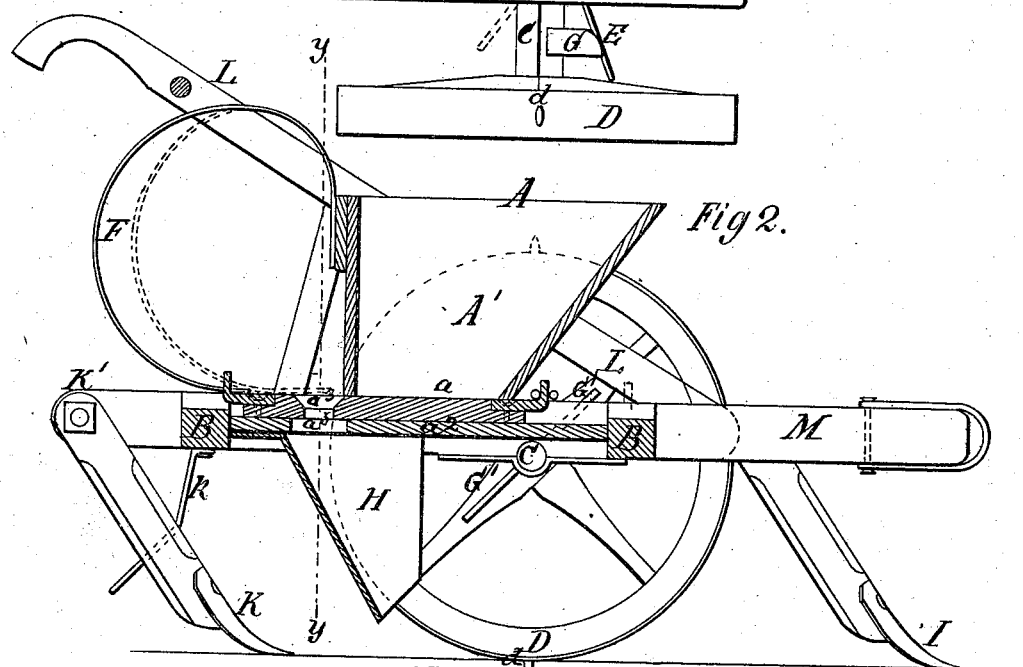
Figure 3:
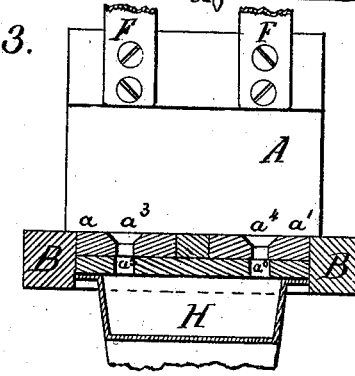

Figure 1 is a top view of my invention with the hopper partially broken away, and showing the sliding bottoms partly open. Fig. 2 is a vertical longitudinal section on the line $x\ x$, Fig. 1; Fig. 3, a vertical section on the line $y\ y$, Fig. 2.

The object of my invention is to provide a corn or other similar seed planter with an attachment whereby two different kinds of seed—for instance, grains of corn and pumpkin-seeds—may be planted at the same time in the same hill, and also so that one kind thereof—for instance, corn—may be dropped in the row with and between the hills containing two kinds of seed; and the nature of my invention consists in certain constructions, combinations, and arrangements of parts, as hereinafter described and specifically claimed, whereby the above-mentioned results are produced in a simple manner.

In order that others skilled in the art may be enabled to make and use my invention, I will now proceed to describe the same with references to the drawings, in which—

A represents a hopper, fixed upon a frame, B, resting on the axle C, and which carries the wheels D, which latter, in order to insure their operation, are provided with traction points or spikes $d$, to take a firm hold of the ground. Both or one of these wheels may be fast with the axle. This hopper A is divided into two compartments by the partition A′, each of which is provided with a movable sliding bottom, $a\ a^1$, arranged above and resting on a stationary bottom, $a^2$. These bottoms $a\ a^1$ are, near their rear ends, provided with openings $a^3\ a^4$, to permit the seed to escape during the operation of the machine, and which openings are hollowed out sufficiently at the upper surface of the bottoms to receive and contain the required quantity of seed to be dropped into each hill; and the stationary bottom $a^2$ is provided with openings $a^5\ a^6$, arranged at its rear end, in such a manner as will bring them underneath and on a line with the openings $a^3\ a^4$ when the sliding bottoms are in a position for dropping the seed.

E E are dropping-levers, arranged upon each side of the front end of the machine, and pivoted at E′, and connected to the front ends of the sliding bottoms $a\ a^1$ by any proper device, or as shown at $e\ e'$, Fig. 1.

F F are springs, arranged to bear against the rear ends of the sliding bottoms, and which work independently of each other, their object being to keep the sliding bottoms in place underneath the hoppers during the intervals in the dropping of the seed. These springs may be constructed and arranged as shown in the drawings, or in any other convenient and practical manner.

G is a single cam-lever, and G′ a double cam-lever. Both are securely fixed upon the axle C, upon opposite sides of the hopper A, and so arranged as to enable their ends to come in contact with the ends of the dropping-levers E E as the wheels D, which are (one or both) made stationary upon the axle C, cause the axle to revolve.

H is a spout, arranged underneath the seed-openings $a^3\ a^4$, and designed to conduct the seed, as it comes from either compartment of the hopper, into the row or furrow made by the plow I, at the front end of the machine.

K K are covering-plows, attached to the rear end of the frame B by bolts K′ K′, and made adjustable, in order to secure the required depth of covering, by means of the rods $k\ k$, which also serve as stays or braces to the standards of the plows, and hold them firmly in place.

L are the handles, and M the draft-beam.

Operation: Supposing, as is often the case, a farmer wishes to utilize the space between the hills of corn in one direction, and raise two different crops from the same field, he places the corn into that compartment of the hopper nearest the single cam-lever G, and into the adjoining compartment he puts the other kind of seed which he desires to plant.

It will be readily perceived that as the machine is put in motion the revolving axle C carries with it the cam-levers G G', which operate the sliding bottoms $a$ $a^1$ by means of the levers E E, and thus carry the seed contained in the openings $a^3$ $a^4$, and held therein by the stationary bottom $a^2$, over the corresponding openings in said stationary bottom, to be discharged; and that, by reason of the double cam-lever G', the sliding bottom upon that side of the planter will drop the seed contained in the compartment above it twice as often as will the one on the opposite side.

It will also be seen that, as one of the arms of the double cam-lever G' is on a line with the cam-lever G, and upon the same side of the shaft or axle C, the two will operate together upon every full revolution of the wheels, and the dropping from both compartments of the hopper will be simultaneous, and both kinds of seed be carried by the spout H into the same hill; and that at each half-revolution of the axle C the other arm of the cam-lever G' will be brought into use, dropping seed from one side of the machine only, and at equal distances between the hills of seed planted by the planter when both of the sliding bottoms are being operated together, as above described.

This machine can be used for dropping fertilizing material in every other hill of seed; and, by putting a double cam-lever on both sides of the hopper, fertilizer can be dropped in every hill.

But I do not claim two slides, operated at all times together; but,

Having thus described my invention, what I claim as new, and desire to secure by Letters Patent, is—

1. In a seed-planter, the sliding bottoms $a$ $a^1$, arranged to operate separately and together alternately, so that two hills of corn are planted for every hill of pumpkin-seed, substantially as and for the purposes described.

2. The sliding bottoms $a$ $a^1$, with openings $a^3$ $a^4$, levers E E, and springs F F, in combination with the revolving axle C, provided with the single cam-lever G and double cam-lever G', constructed and arranged to operate substantially as and for the purposes set forth.

Witness my hand in matter of my application for a patent for improved seed-planters.

JOSEPH C. JENKINS.

Witnesses:
  E. J. MIDDLETON, Jr.,
  JNO. S. SLATER.